(12) United States Patent
Nippa et al.

(10) Patent No.: US 8,726,317 B2
(45) Date of Patent: May 13, 2014

(54) OPTICAL-TO-MILLIMETER WAVE CONVERSION

(75) Inventors: David W. Nippa, Dublin, OH (US); Richard W. Ridgway, Westerville, OH (US)

(73) Assignee: Battelle Memorial Institute, Columbus, OH (US)

( * ) Notice: Subject to any disclaimer, the term of this patent is extended or adjusted under 35 U.S.C. 154(b) by 310 days.

(21) Appl. No.: 12/739,524

(22) PCT Filed: Sep. 30, 2008

(86) PCT No.: PCT/US2008/078243
§ 371 (c)(1),
(2), (4) Date: May 13, 2010

(87) PCT Pub. No.: WO2009/055210
PCT Pub. Date: Apr. 30, 2009

(65) Prior Publication Data
US 2010/0263001 A1    Oct. 14, 2010

Related U.S. Application Data

(60) Provisional application No. 60/982,510, filed on Oct. 25, 2007.

(51) Int. Cl.
*H04N 7/20* (2006.01)
*H04N 7/173* (2011.01)

(52) U.S. Cl.
USPC .............................. 725/67; 725/128; 725/129

(58) Field of Classification Search
None
See application file for complete search history.

(56) References Cited

U.S. PATENT DOCUMENTS 2,003,003 A * 5/1935 Marbury ........................ 134/188

4,770,483 A    9/1988 Ridgway
(Continued)

FOREIGN PATENT DOCUMENTS

JP    11151852 A    6/1999
JP    3835047 B2    11/2006
(Continued)

OTHER PUBLICATIONS

Kawanishi et al., "Millimeter-wave generation and baseband modulation by using reciprocating optical modlation for radio-on-fiber systems in V-band", International Topical Meeting on Microwave Photonics, Sep. 10-12, 2003.
(Continued)

*Primary Examiner* — Brian T Pendleton
*Assistant Examiner* — Jean D Saint Cyr
(74) *Attorney, Agent, or Firm* — Dinsmore & Shohl LLP

(57) ABSTRACT

A method of converting a modulated optical signal to an encoded electrical signal is provided. The method utilizes a device comprising an electrooptic sideband generator, an optical filter, and an optical/electrical converter. Initially, the modulated optical signal, which carries encoded optical data, is directed to an optical input of the electrooptic sideband generator. The electrooptic sideband generator is driven to generate frequency sidebands about a carrier frequency of the input optical signal. The optical filter is utilized to discriminate between the frequency sidebands and the carrier frequency and combine sidebands-of-interest to yield at least one frequency-converted optical signal comprising a millimeter wave modulation frequency. The frequency converted optical signal carries the encoded optical data and the modulation frequency is a function of the spacing of the sidebands-of-interest. The frequency-converted optical signal is directed to the optical/electrical converter where it is converted to an encoded electrical signal. Additional embodiments are disclosed and claimed.

20 Claims, 4 Drawing Sheets

(56) References Cited

U.S. PATENT DOCUMENTS

| | | | |
|---|---|---|---|
| 4,839,709 | A | 6/1989 | Zurakowski |
| 5,015,052 | A | 5/1991 | Ridgway et al. |
| 5,777,771 | A | 7/1998 | Smith |
| 6,111,678 | A | 8/2000 | Mathoorasing et al. |
| 6,610,219 | B2 | 8/2003 | McGinniss et al. |
| 6,674,969 | B1 | 1/2004 | Ogusu |
| 6,687,425 | B2 | 2/2004 | Ridgway et al. |
| 6,853,758 | B2 | 2/2005 | Ridgway et al. |
| 6,931,164 | B2 | 8/2005 | Risser et al. |
| 6,940,638 | B2 * | 9/2005 | Kondoh et al. ............ 359/326 |
| 7,446,696 | B2 * | 11/2008 | Kondo et al. .............. 342/52 |
| 7,486,247 | B2 | 2/2009 | Ridgway et al. |
| 2002/0001116 | A1 | 1/2002 | Kajiya et al. |
| 2003/0030868 | A1 * | 2/2003 | Sasai et al. ............. 359/154 |
| 2003/0128417 | A1 | 7/2003 | Kawanishi et al. |
| 2004/0131303 | A1 | 7/2004 | Nippa et al. |
| 2004/0184694 | A1 | 9/2004 | Ridgway et al. |
| 2005/0226547 | A1 | 10/2005 | Ridgway |
| 2007/0166054 | A1 | 7/2007 | Yu et al. |
| 2007/0292143 | A1 | 12/2007 | Yu et al. |
| 2008/0063028 | A1 * | 3/2008 | Lekkas et al. ............ 375/130 |
| 2008/0111735 | A1 | 5/2008 | Ridgway et al. |
| 2008/0112705 | A1 | 5/2008 | Ridgway et al. |
| 2008/0199124 | A1 * | 8/2008 | Nagatsuma et al. .......... 385/8 |
| 2009/0016729 | A1 | 1/2009 | Ridgway et al. |
| 2009/0297155 | A1 * | 12/2009 | Weiner et al. ............. 398/115 |

FOREIGN PATENT DOCUMENTS

| | | |
|---|---|---|
| JP | 2007-163963 A | 6/2007 |
| JP | 2009033226 A | 2/2009 |
| WO | 2007027450 A1 | 3/2007 |

OTHER PUBLICATIONS

International Search Report and Written Opinion for PCT/US2008/0078243 dated Apr. 20, 2009.

Japanese Office Action pertaining to Japanese Application No. JP 2010-531112 dated Dec. 13, 2012.

Extended European Search Report as it relates to EP Appln. No. 08842299.3 mailed Feb. 27, 2013.

Jia, Z. et al., "Key Enabling Technologies for Optical-Wireless Networks: Optical Millimeter-Wave Generation, Wavelength Reuse, and Architecture," Journal of Lightwave Technology, vol. 25, No. 11, Nov. 2007.

* cited by examiner

OPTICAL-TO-MILLIMETER WAVE CONVERSION

CROSS-REFERENCE TO RELATED APPLICATIONS

This application is a U.S. national phase entry of International Application No. PCT/US2008/078243, filed Sep. 30, 2008, which claims the benefit of U.S. Provisional Application Ser. No. 60/982,510, filed Oct. 25, 2007.

JOINT RESEARCH AGREEMENT

The inventions claimed herein were made as a result of the activities undertaken within the scope of a joint research agreement between Battelle Memorial Institute and Optimer Photonics, Inc.

The present disclosure relates to the conversion of a modulated optical signal to a modulated millimeter-wave signal. The subject technology allows optical signals that have been modulated in the digital or analog domain to be converted to a millimeter-wave for transmission as an encoded electrical signal.

The present disclosure partially relies upon technology described in US Patent Application Pub. No. 2008/0112705, the disclosure of which is incorporated herein by reference. and presents a means by which relatively low frequency electronic components and standard communications-grade optical components can be used to create a high frequency, data encoded millimeter-wave. The aforementioned publication, light from a laser source is over-modulated using a low-$V\pi$ optical modulator. The over-modulation creates sidebands on the optical signal. The sidebands are filtered, using an optical filter such as an arrayed waveguide grating (AWG), to define two dominant optical peaks and are recombined to define the millimeter-wave carrier frequency. A second modulator is used to place data onto the optical signal. Optical amplification is selectively added to the system as needed to ensure sufficient optical output. The optical signal is converted to a millimeter wave using a photodiode, such as a unitraveling carrier photodiode (UTC-PD). The millimeter wave can be transmitted wirelessly using antenna, or via other millimeter wave transmission approaches, and can be received using a millimeter-wave detector.

The present inventors have noted that data in telecommunications systems can originate or arrive in the form of a modulated optical signal at data rates on the order of approximately 10 gigabytes per second (GBPS). For this signal to be compatible with the electrical-to-millimeter-wave converter described in US Pub. No. 2008/0112705, the optical signal would need to be converted to an electrical signal, amplified, and fed to an electrooptic modulator. This conversion from optical to electrical and then back to optical can be avoided in practicing the approach described herein.

As will be described in further detail herein, data arrives as a modulated optical signal, which can for example be encoded using an analog modulation scheme that includes on-off keying. After optical amplification, the modulated optical signal is directed to an electrooptic sideband generator. This sideband generator, which may be an electrooptic modulator, is used to create two optical peaks separated by a millimeter wave carrier frequency. The methodology described in US Pub. No. 2008/0112705 is used to create these peaks. Generally, a low-$V\pi$ electrooptic modulator is over-driven to create sidebands separated by the modulation frequency. The sidebands are filtered using an optical filter, such as an AWG, to define two dominant optical peaks and are recombined to define the millimeter-wave carrier frequency. The optical signal is converted to a millimeter wave using an optical/electrical converter, such as a unitravelling carrier (UTC) photodiode, that is compatible with the wavelength of the incoming optical signal. Optical amplification can be selectively added to the system as needed to ensure sufficient optical output. The millimeter wave can be transmitted wirelessly using an antenna, or via other millimeter wave transmission approaches, and can be received using a millimeter wave detector.

The conversion approach described herein utilizes an optical source and data-encoded optical modulation that are external to the system. The modulated optical signal is the sole source of encoded data in the device. The millimeter wave modulated optical carrier signal is created using sideband generation and complementary optical filtering to direct sidebands-of-interest to a common optical output. The sideband generator can utilize electrooptic modulation to add millimeter-wave modulation to a modulated optical signal. This electrooptic modulation can occur at the carrier frequency of the optical signal. The conversion approach described herein maintains the modulated optical signal in the optical domain as it passes through the sideband generator and works well with optical signals that have been modulated with analog or digital signals and is compatible with optical networks.

In accordance with one embodiment disclosed herein, a method of converting a modulated optical signal to an encoded electrical signal is provided. The method utilizes a device comprising an electrooptic sideband generator, an optical filter, and an optical/electrical converter. Initially, the modulated optical signal, which carries encoded optical data, is directed to an optical input of the electrooptic sideband generator. The electrooptic sideband generator is driven to generate frequency sidebands about a carrier frequency of the input optical signal. The optical filter is utilized to discriminate between the frequency sidebands and the carrier frequency and combine sidebands-of-interest to yield at least one frequency-converted optical signal comprising a millimeter wave modulation frequency. The frequency converted optical signal carries the encoded optical data and the modulation frequency is a function of the spacing of the sidebands-of-interest. The frequency-converted optical signal is directed to the optical/electrical converter where it is converted to an encoded electrical signal.

In accordance with another embodiment disclosed herein, a data transmission network comprising an optical source, an optical-to-millimeter wave converter, and a millimeter wave transmitter is provided.

The following detailed description of specific embodiments disclosed herein can be best understood when read in conjunction with the following drawings, where like structure is indicated with like reference numerals and in which.

Figure 1:
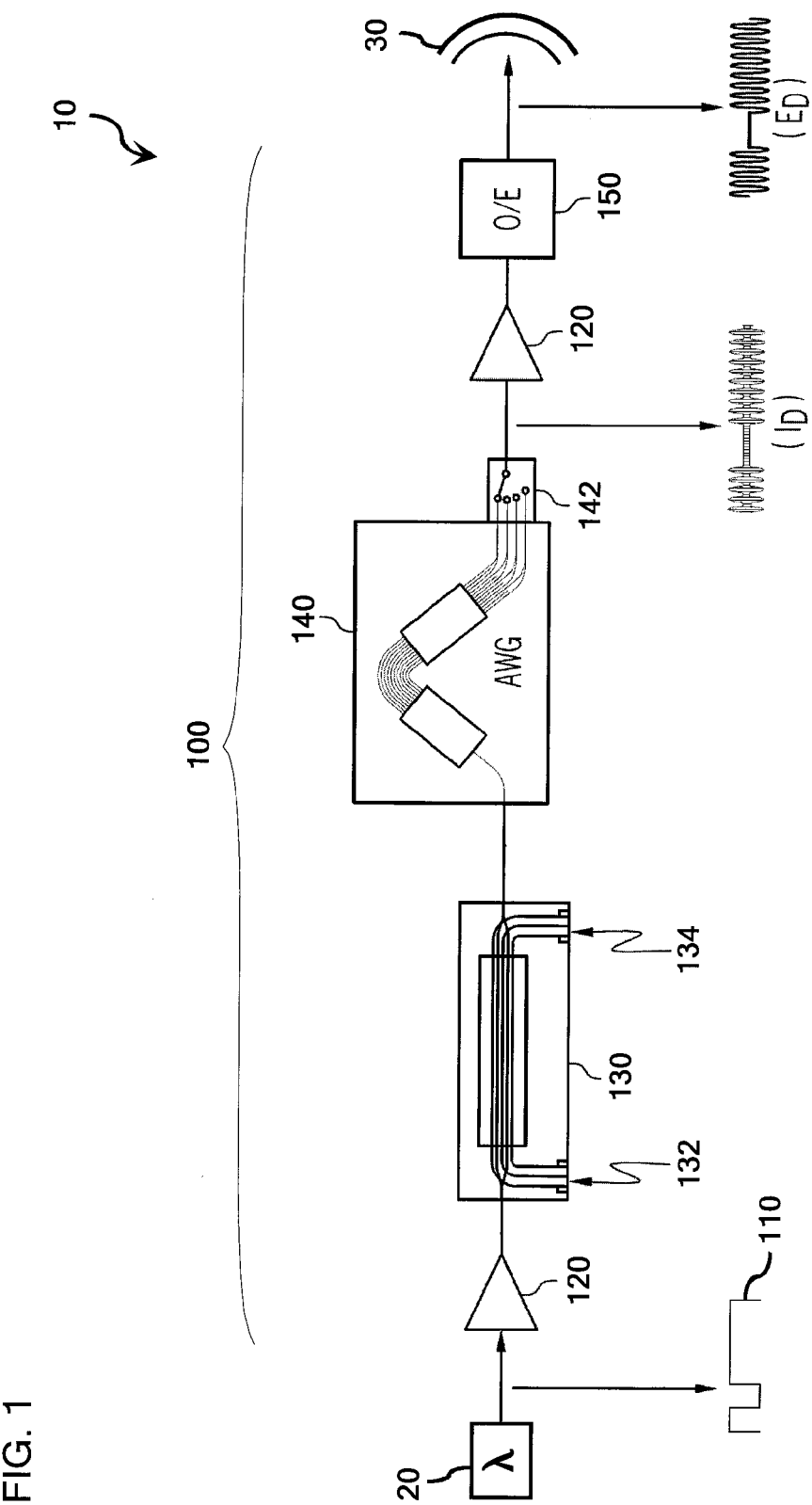
FIG. 1 is a schematic illustration of a data transmission network for converting a modulated optical signal to an encoded electrical signal.

A data transmission network and a method of converting a modulated optical signal λ to an encoded electrical signal $E_D$ are described herein with initial reference to FIG. 1, which is a simplified schematic illustration of a data transmission network 10 comprising an optical source 20, a millimeter wave transmitter 30, and an optical-to-millimeter wave converter 100. Although the data transmission network illustrated in FIG. 1 comprises a relatively simple point-to-point data link, it is contemplated that the concepts introduced herein will also be applicable to more complex point-to-point communications systems or point-to-multipoint communications systems, such as those employed in temporary or permanent telecommunications networks. It is also contemplated that the concepts introduced herein will also be applicable in a variety of other types of data transmission networks. For example, and not by way of limitation, where the modulated optical signal carries encoded optical HDTV data and the encoded millimeter wave is transmitted in a wireless HDTV link or where the modulated optical signal carries encoded satellite communications data and the encoded millimeter wave is transmitted as an inter-satellite link.

Figure 2:
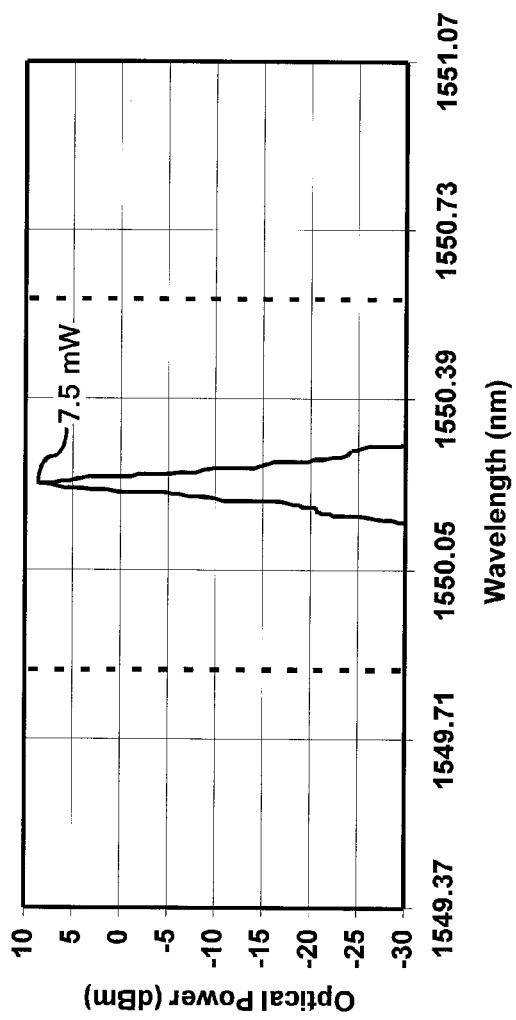
FIG. 2 illustrates the spectrum of an optical signal without encoded data, prior to sideband generation.
Figure 3:
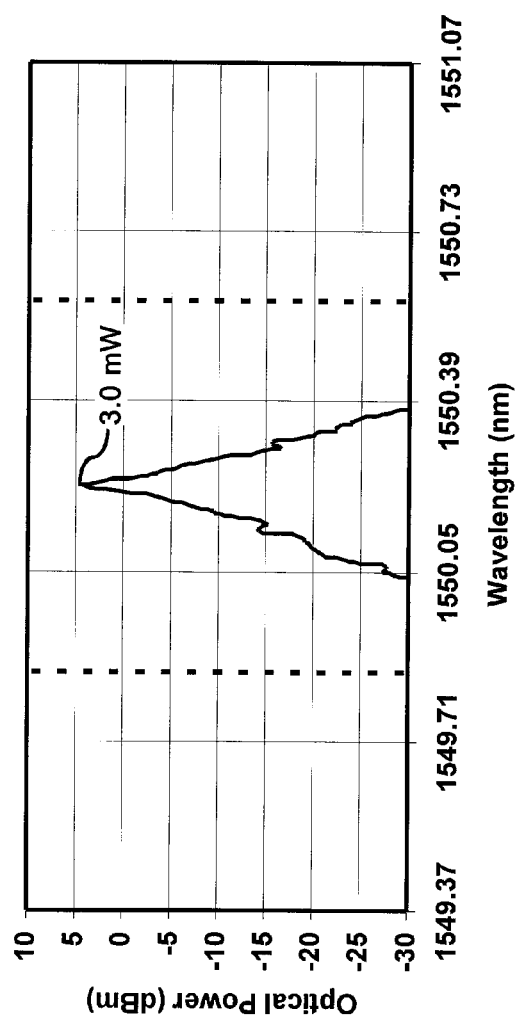
FIG. 3 illustrates the spectrum of an optical signal with 10 GBPS encoded data prior to sideband generation.

The encoded optical data 110 that is carried by the modulated optical signal λ is illustrated schematically in FIG. 1. FIGS. 2 and 3 illustrate the spectra of the optical signal λ without encoded data (FIG. 2) and with 10 GBPS encoded data (FIG. 3). The encoded optical data is manifested as intensity variations in the modulated optical signal. In some cases, the encoded optical data is manifested in the modulated optical signal at data rates on the order of approximately 10 GBPS. It is noted that the optical signal λ broadens with the addition of frequency components from the encoded data. If appropriate, the modulated optical signal λ can be amplified by a suitable optical amplifier 120. For example, optical amplifiers, such as Erbium-doped fiber amplifiers can increase optical power without excessive loss of data modulation on the optical signal.

In the illustrated embodiment, the optical-to-millimeter wave converter 100 comprises an electrooptic sideband generator 130, an optical filter 140, and an optical/electrical converter 150. The modulated optical signal λ is converted to the encoded electrical signal $E_D$ by first directing the modulated optical signal λ to an optical input of the electrooptic sideband generator 130. The modulated optical signal λ can be directed to the optical input of the electrooptic sideband generator 130 utilizing optical waveguide transmission, fiber optic transmission, free space projection, or combinations thereof.

Figure 4:
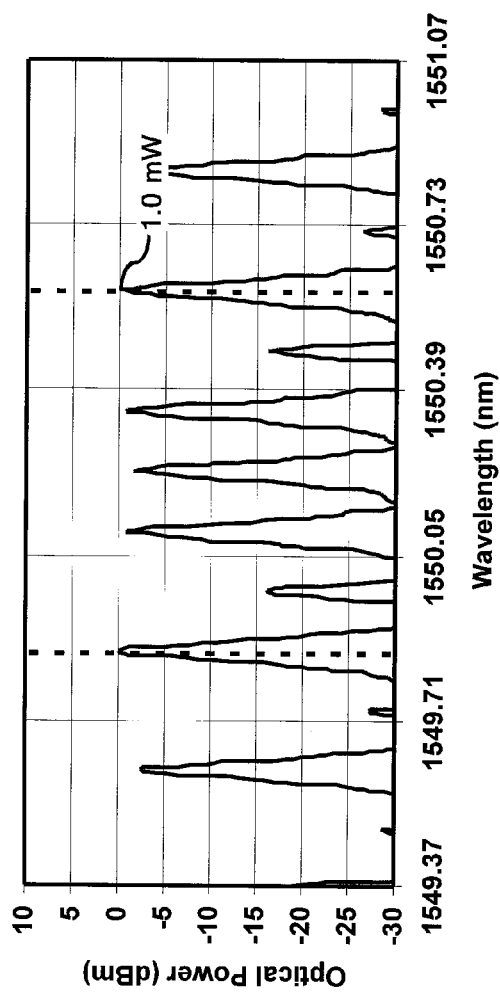
FIG. 4 illustrates the spectrum of an unfiltered optical signal without encoded data, following sideband generation.
Figure 5:
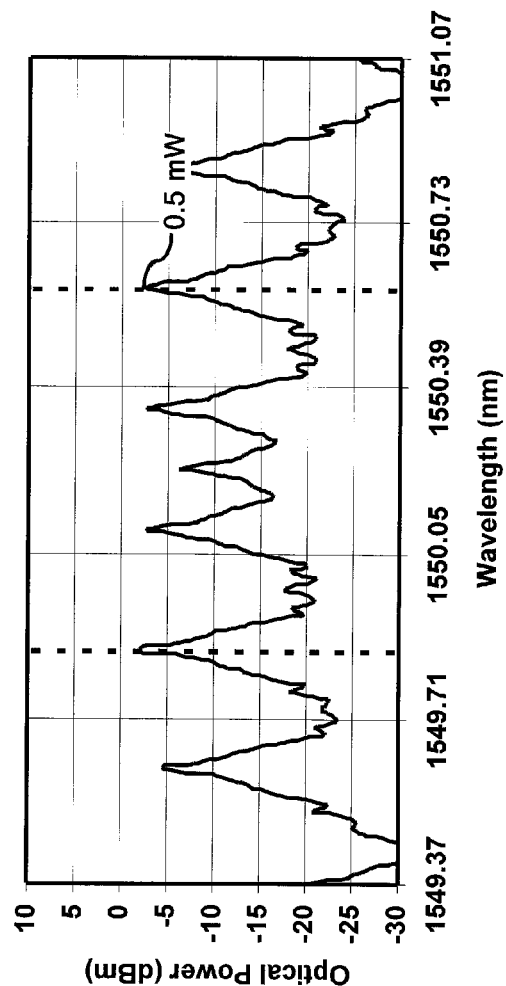
FIG. 5 illustrates the spectrum of an unfiltered optical signal with 10 GBPS encoded data, following sideband generation.

The electrooptic sideband generator 130 operates on the optical signal λ to generate frequency sidebands about the carrier frequency of the input optical signal λ. These frequency sidebands are illustrated in FIG. 4 (no encoded data) and FIG. 5 (10 GBPS encoded data). Generally, the sideband generator 130 comprises a phase modulating electrooptic interferometer, e.g., a Mach-Zehnder interferometer, where phase modulation is controlled by applying suitable control signals across the control voltage terminals 132, 134 of the sideband generator 130. The sideband generator 130 can be driven at control voltages substantially larger than $V_\pi$ to generate the frequency sidebands, where $V_\pi$ represents the voltage at which a π phase shift is induced in the optical waveguide of the sideband generator 130. The specific mechanism by which these sidebands are generated is described in detail in US Pub. No. 2008/0112705.

The optical filter 140 is used to discriminate between the frequency sidebands and the carrier frequency and combine sidebands-of-interest to yield at least one frequency-converted optical signal $I_D$ comprising a millimeter wave modulation frequency. This optical filtering function can be accomplished using a variety of technologies, including Bragg grating reflective filters, wavelength-selective Mach-Zehnder filters, multilayer thin film optical filters, arrayed waveguide gratings (AWG), micro ring resonator filters, and directional coupler filters that are wavelength selective. An arrayed waveguide grating is particularly useful because it is an integrated optical device with multiple channels characterized by very narrow bandwidths. A suitable AWG optical filter configuration is described in detail in US Pub. No. 2008/0112705. A telecommunications-grade arrayed waveguide grating (AWG) with 60 GHz channels can be used as the optical filter 30 to filter out the carrier optical signal $\lambda_0$ and combine the two optical sidebands of interest, forming a millimeter wave optical signal modulated at 120 GHz.

Figure 6:
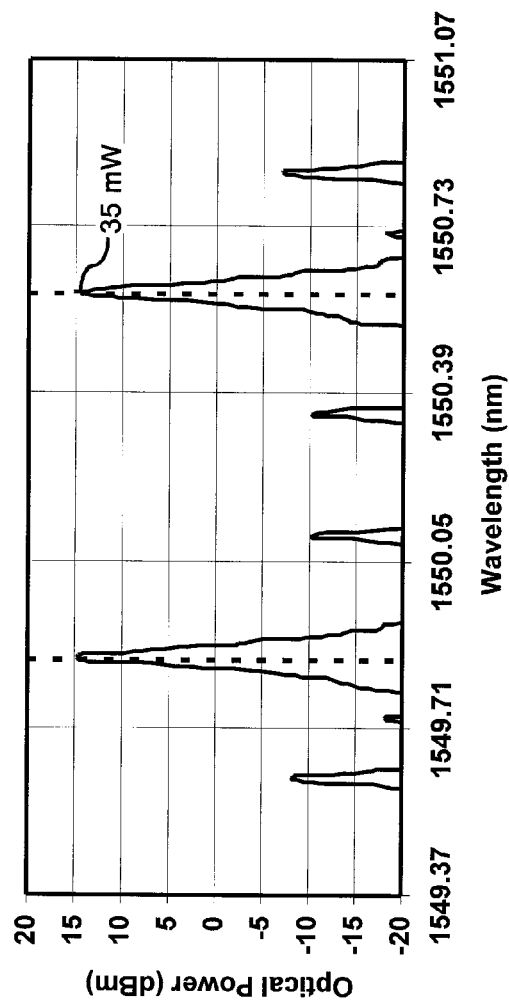
FIG. 6 illustrates the spectrum of a filtered optical signal without encoded data, following sideband generation.
Figure 7:
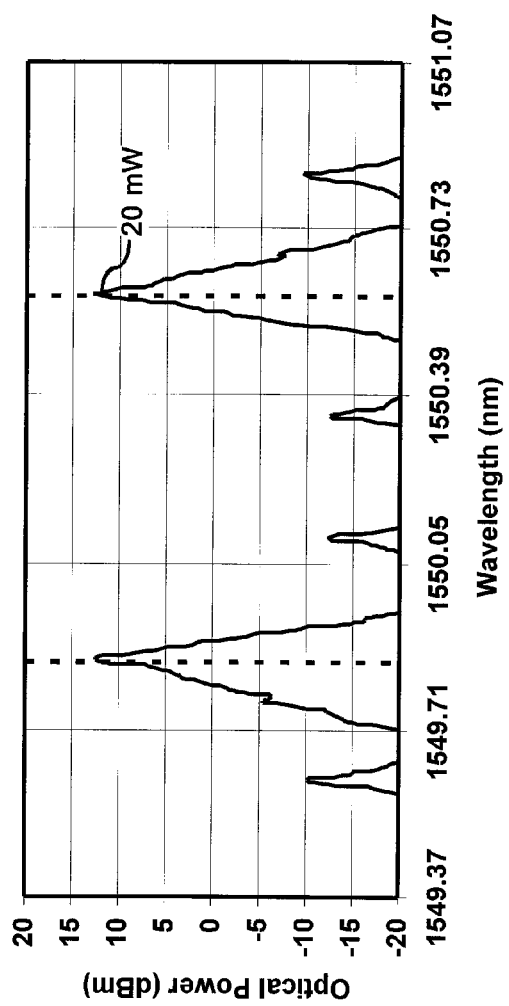
FIG. 7 illustrates the spectrum of a filtered optical signal with 10 GBPS encoded data, following sideband generation.

FIGS. 6 and 7 illustrate the respective spectra in the cases where the filtered, frequency converted optical signal is free of encoded data (FIG. 6) and carries encoded optical data (FIG. 7). The modulation frequency at the output of the filter 140 is a function of the spacing of the sidebands-of-interest in the frequency domain. As is described in detail in US Pub. No. 2008/0112705, the filter 140 can utilize dynamic optical signal switching circuitry 142 or static optical signal combining circuitry to combine the sidebands-of-interest to yield the frequency-converted optical signal.

The frequency-converted optical signal $I_D$, which carries the encoded optical data, is directed to the optical/electrical converter 150 for conversion to the encoded electrical signal $E_D$, which can be transmitted as an encoded millimeter wave. The optical/electrical converter 150 preserves the data rate of the modulated optical signal when converting the frequency-converted optical signal $I_D$ to the encoded electrical signal $E_D$. Encoded data in the encoded electrical signal $E_D$ is manifested as variations in the intensity of the signal. It is contemplated that the encoded millimeter wave can be transmitted using a waveguide or wirelessly, using one or more transmitting antennae or a network of transmitting and receiving antennae.

For the purposes of defining and describing the present invention, it is noted that the wavelength of an "optical signal" is not limited to any particular wavelength or portion of the electromagnetic spectrum. Rather, "optical signals" are defined herein to cover any wavelength of electromagnetic radiation capable of propagating in an optical waveguide. For example, optical signals in the visible and infrared portions of the electromagnetic spectrum are both capable of propagating in an optical waveguide. An optical waveguide may comprise any suitable signal propagating structure. Examples of optical waveguides include, but are not limited to, optical fibers, slab waveguides, and thin-films used, for example, in integrated optical circuits.

For the purposes of describing and defining the present invention, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

For the purposes of describing and defining the present invention, it is noted that reference herein to millimeter wave signals denote frequencies extending from approximately 30 GHz to well above 300 GHz such that the band includes wavelengths from approximately 10 mm to wavelengths that are a mere fraction of a millimeter. Accordingly, the designation herein of "millimeter wave" signals also includes "sub-millimeter" waves.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present invention or to emphasize alternative or additional features that may or may not be utilized in a particular embodiment of the present invention.

For the purposes of describing and defining the present invention it is noted that the terms "substantially" and "approximately" are utilized herein to represent the inherent degree of uncertainty that may be attributed to any quantitative comparison, value, measurement, or other representation. The terms "substantially" and "approximately" are also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

The invention claimed is:

1. A method of converting a modulated optical signal to an encoded electrical signal utilizing a device comprising an electrooptic sideband generator, an optical filter, and an optical/electrical converter, wherein the method comprises:
   directing the modulated optical signal to an optical input of the electrooptic sideband generator, wherein the modulated optical signal carries encoded optical data;
   over-driving the electrooptic sideband generator at a control voltage larger than $V\pi$, where $V\pi$ represents a voltage at which a $\pi$ phase shift is induced in an optical waveguide of the sideband generator, to generate frequency sidebands about a carrier frequency of the input optical signal;
   utilizing the optical filter to discriminate between the frequency sidebands and the carrier frequency and combine sidebands-of-interest, wherein the frequency spacing of the sidebands-of-interest defines a millimeter wave modulation frequency to yield at least one frequency-converted optical signal wherein the frequency converted optical signal carries the encoded optical data and the millimeter wave modulation frequency is a function of the spacing of the sidebands-of-interest in the frequency domain;
   directing the frequency-converted optical signal carrying the encoded optical data to the optical/electrical converter; and
   utilizing the optical/electrical converter to convert the frequency-converted optical signal to an encoded electrical signal.

2. A method as claimed in claim 1 wherein the encoded optical data is manifested as intensity variations in the modulated optical signal.

3. A method as claimed in claim 1 wherein the encoded optical data is manifested in the modulated optical signal at data rates on the order of approximately 10 GBPS.

4. A method as claimed in claim 3 wherein the optical/electrical converter preserves the data rate of the modulated optical signal when converting the frequency-converted optical signal to an encoded electrical signal.

5. A method as claimed in claim 1 wherein the modulated optical signal is directed to the optical input of the electrooptic sideband generator utilizing optical waveguide transmission, fiber optic transmission, free space projection, or combinations thereof.

6. A method as claimed in claim 1 wherein the modulated optical signal carrying encoded optical data is maintained in the optical domain as it passes from the optical input of the electrooptic sideband generator to an optical output of the electrooptic sideband generator.

7. A method as claimed in claim 1 wherein the modulated optical signal is the sole source of encoded data in the device.

8. A method as claimed in claim 1 wherein the encoded electrical signal is transmitted as an encoded millimeter wave.

9. A method as claimed in claim 8 wherein the encoded optical data comprises telecommunications data and the encoded millimeter wave is transmitted in a point-to-point communications system or a point-to-multipoint communications system.

10. A method as claimed in claim 8 wherein the encoded optical data comprises HDTV data and the encoded millimeter wave is transmitted in a wireless HDTV link.

11. A method as claimed in claim 8 wherein the encoded optical data comprises satellite communications data and the encoded millimeter wave is transmitted as an inter-satellite link.

12. A method as claimed in claim 8 wherein the encoded millimeter wave is characterized by a modulation frequency of at least approximately 30GHz.

13. A method as claimed in claim 8 wherein the encoded millimeter wave is transmitted wirelessly, using one or more transmitting antennae or a network of transmitting and receiving antennae.

14. A method as claimed in claim 8 wherein the encoded millimeter wave is transmitted using a waveguide.

15. A method as claimed in claim 1 wherein encoded electrical data in the encoded electrical signal is manifested as variations in the intensity of the encoded electrical signal.

16. A method as claimed in claim 1 wherein the electrooptic sideband generator comprises an electrooptic interferometer and the optical filter comprises an arrayed waveguide grating.

17. A method as claimed in claim 1 wherein the optical filter comprises optical circuitry that combines the sidebands-of-interest to yield the frequency-converted optical signal.

18. A method as claimed in claim 1 wherein:
   the sideband generator comprises a phase modulator comprising an optical waveguide and a modulation controller that drives the sideband generator at a control voltage substantially larger than $V\pi$ to generate the frequency sidebands, where $V\pi$ represents the voltage at which a $\pi$ phase shift is induced in the optical waveguide; and
   the optical filter directs the sidebands-of-interest to a common optical output.

19. A data transmission network comprising an optical source, an optical-to-millimeter wave converter, and a millimeter wave transmitter, wherein:
   the optical-to-millimeter wave converter comprises an electrooptic sideband generator, an optical filter, and an optical/electrical converter;

the optical source directs a modulated optical signal carrying encoded optical data to an optical input of the electrooptic sideband generator;

the electrooptic sideband generator is over-driven at a control voltage larger than $V\pi$, where $V\pi$ represents a voltage at which a $\pi$ phase shift is induced in an optical waveguide of the sideband generator, to generate frequency sidebands about a carrier frequency of the input optical signal;

the optical filter discriminates between the frequency sidebands and the carrier frequency, combines sidebands-of-interest, where the frequency spacing of the sidebands-of-interest defines a millimeter wave modulation frequency, to yield at least one frequency-converted optical signal comprising a millimeter wave modulation frequency, and directs the frequency-converted optical signal to the optical/electrical converter;

the millimeter wave modulation frequency of the frequency-converted optical signal is a function of the spacing of the sidebands-of-interest in the frequency domain; and the optical/electrical converter converts the frequency-converted optical signal to an encoded electrical signal and directs the encoded electrical signal to the millimeter wave transmitter.

20. A data transmission network as claimed in claim 19 wherein:

the data transmission network comprises a point-to-point communications system or a point-to-multipoint communications system and the encoded optical data comprises telecommunications data;

the data transmission network comprises a wireless HDTV link and the encoded optical data comprises HDTV data; or the data transmission network comprises an inter-satellite link and the encoded optical data comprises satellite communications data.

* * * * *

UNITED STATES PATENT AND TRADEMARK OFFICE
CERTIFICATE OF CORRECTION

PATENT NO.       : 8,726,317 B2                                            Page 1 of 1
APPLICATION NO.  : 12/739524
DATED            : May 13, 2014
INVENTOR(S)      : Nippa et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 386 days.

Signed and Sealed this

Twenty-ninth Day of September, 2015

Michelle K. Lee
*Director of the United States Patent and Trademark Office*